United States Patent [19]

Democrate et al.

[11] 4,152,695
[45] May 1, 1979

[54] METHOD OF WRITING INFORMATION RELATING TO FAULTS IN A MAGNETIC RECORDING MEDIUM

[75] Inventors: Gérard Democrate, Plaisir; Claude Cardot, Eaubonne; Jacques Droux, Montfermeil; André Oisel, Elancourt, all of France

[73] Assignee: Compagnie Internationale Pour l'Informatique, France

[21] Appl. No.: 835,402

[22] Filed: Sep. 21, 1977

[30] Foreign Application Priority Data

Jan. 27, 1977 [FR] France ............................ 77 02251

[51] Int. Cl.$^2$ .......................................... G06F 11/10
[52] U.S. Cl. ................................. 340/146.1 F; 360/47
[58] Field of Search ............... 340/146.1 F; 364/200, 364/900; 360/47, 53

[56] References Cited

U.S. PATENT DOCUMENTS

| | | | |
|---|---|---|---|
| 3,771,136 | 11/1973 | Heneghan et al. | 364/200 |
| 3,771,143 | 11/1973 | Taylor | 364/200 |
| 3,781,826 | 12/1973 | Beausoleil | 364/200 |
| 3,868,646 | 2/1975 | Bergman | 364/200 |
| 4,016,547 | 4/1977 | Page | 360/47 |

Primary Examiner—Charles E. Atkinson
Attorney, Agent, or Firm—Lowe, King, Price & Becker

[57] ABSTRACT

A magnetic recording disc includes a plurality of sectors, each of which includes a plurality of data tracks and a reference zone containing information for identifying the data tracks. Some of the sectors are standby sectors containing information which would normally be contained in the sectors containing the data tracks. The reference zones of all sectors contain binary fault indicating bits which indicate whether a particular sector contains faults, and parity bits having values dependent on the location of the parity bit and the value of the fault bit at the same location as the parity bit. A data processor commands a read out head for the disc to be located at a particular position. From the command position of the data processor and the value of the fault bit, the data processor computes an expected parity bit value. The expected parity bit value is compared with the parity bit value read from the disc to provide an indication as to whether the fault bit is accurate.

15 Claims, 9 Drawing Figures

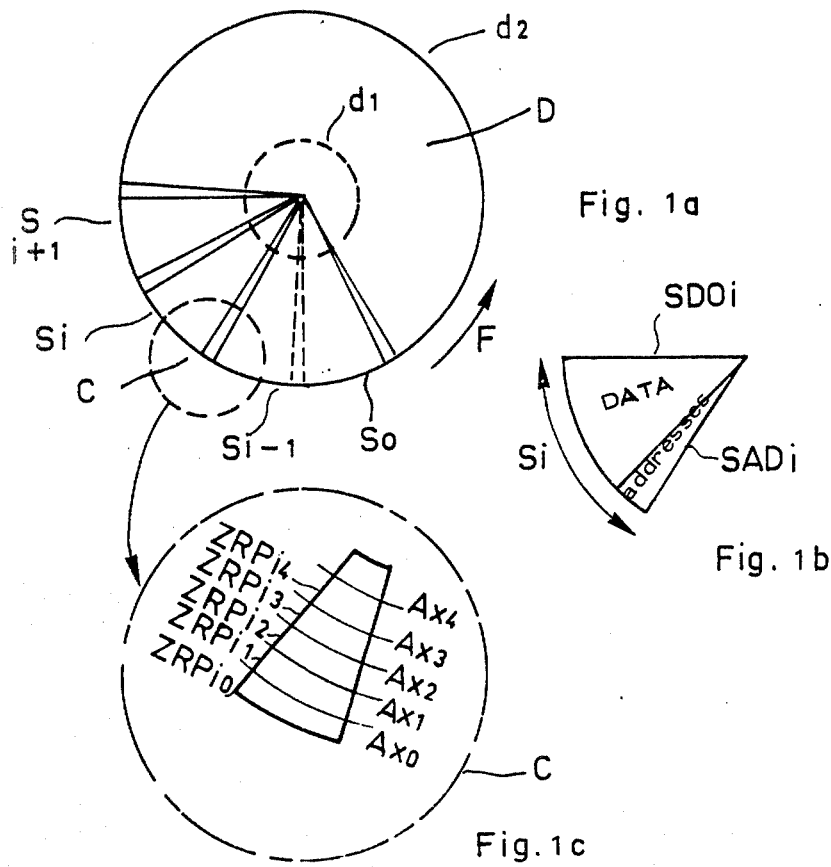
Fig. 1a
Fig. 1b
Fig. 1c
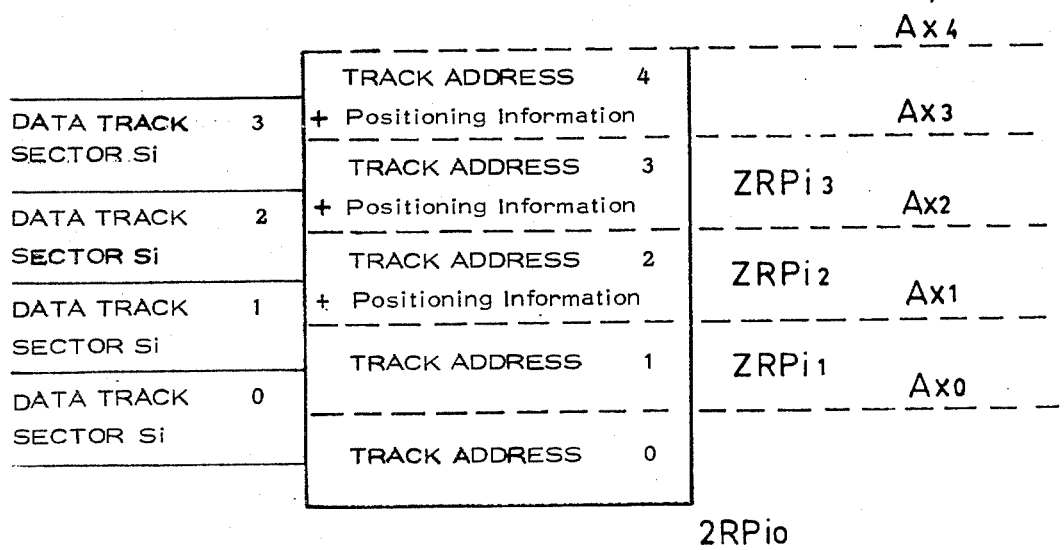
Fig. 1d

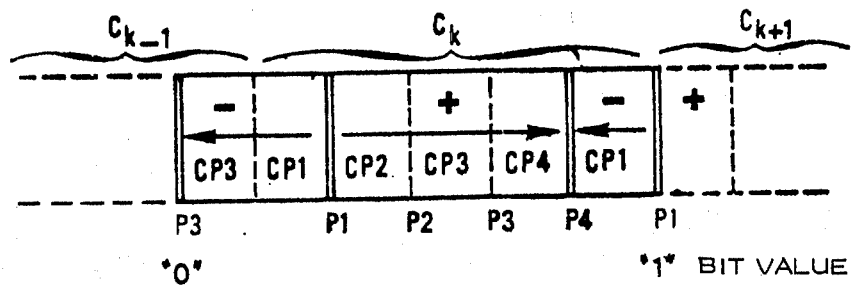
FIG: 2
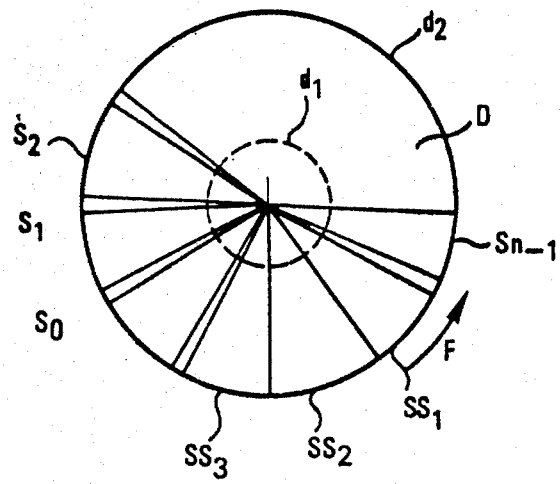
FIG: 3a
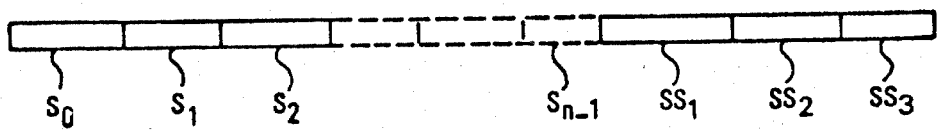
FIG: 3b

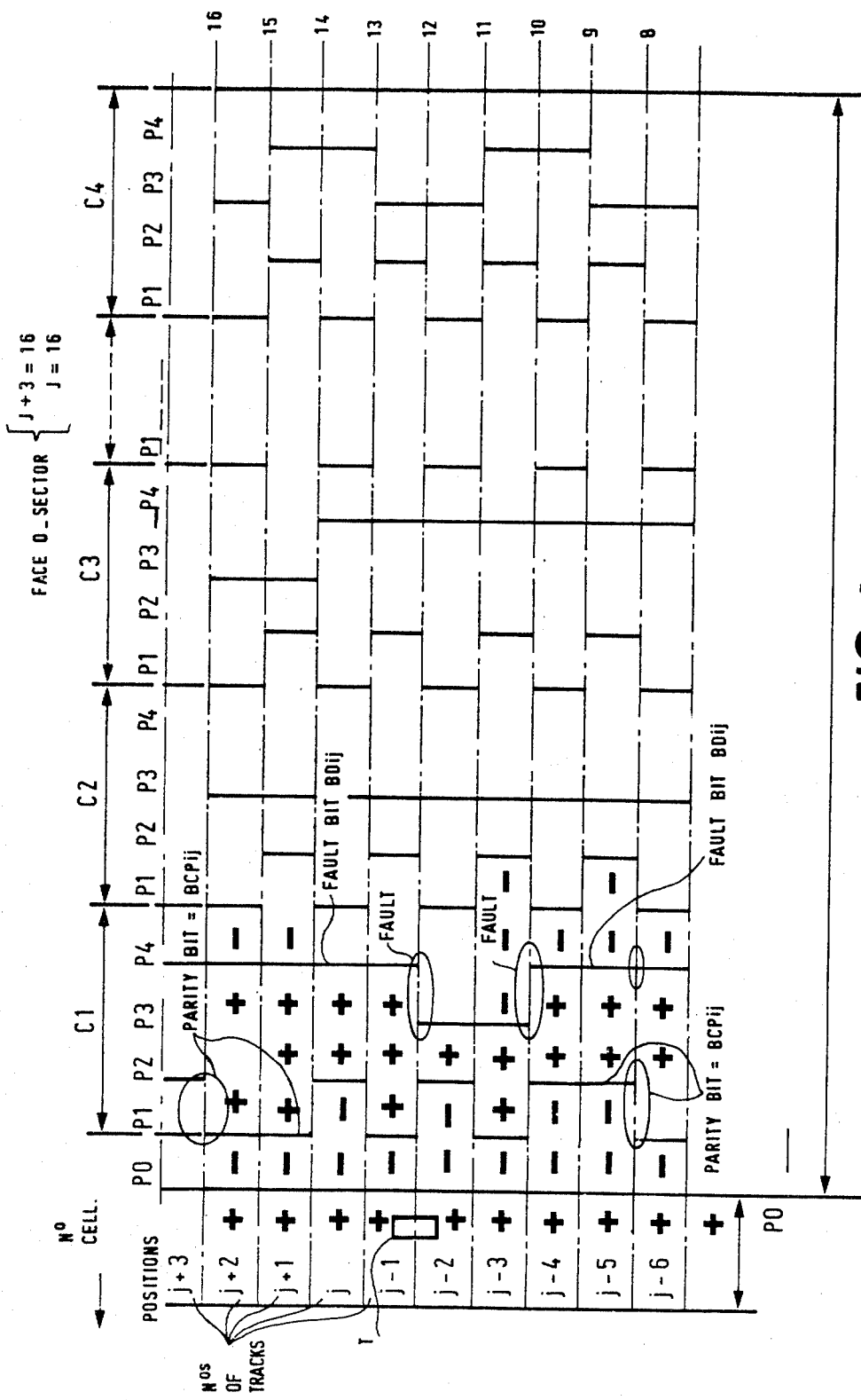
FIG:4

METHOD OF WRITING INFORMATION RELATING TO FAULTS IN A MAGNETIC RECORDING MEDIUM

FIELD OF THE INVENTION

The present invention relates to packing or writing information into a magnetic recording medium and, more particularly, to packing fault indicating bits into a magnetic recording medium.

BACKGROUND OF THE INVENTION

In present-day data processing systesm, memories are more and more frequently being made of magnetic discs because discs have large storage capacity and require a relatively short time for magnetic read/write heads to access information situated anywhere on the discs from the moment when the heads receive an instruction to access this information from the processing system.

It is known that magnetic discs carry information in coded form on concentric circular recording tracks having a width not exceeding a few hundredths of a millimeter and formed on both faces of the discs. The tracks are identified by alloting them a serial number j (j being a whole number) between zero and (N−1), where N is a total number of recording tracks. The coded expression of a serial number j of a track is called an address. The code expressions are most frequently in bindary codes.

It is known that for small storage capacity memories, containing only one or two discs, the addresses of the tracks on one face of a disc are recorded on said face so that a maximum amount of space is received for recording data and a minimum amount of space is set aside for recording the addresses and for recording information required to servo-control the position of the magnetic head to the several tracks of the one face.

In current practice, the information is preferably distributed over equal and adjacent sectors of a circle, each sector consisting of two parts having unequal areas. The larger part contains data intended to be processed by the data-processing system to which the disc memory belongs, while the smaller part, termed a reference zone, contains the track addresses and information for identifying the tracks, i.e., the information for servo-controlling position. Generally, one face of a disc is divided into several tens of sectors.

Each reference zone contains a certain number of cells, each of which contains an item of information required to servo-control disc position to one of the tracks and one address bit, as described in United States patent application Ser. No. 765,058 entitled "Method of Writing Addresses on a Magnetic Recording Medium" filed Feb. 2, 1977, and commonly assigned with the present application.

It is to be recalled that a binary "bit" refers to binary 1 or 0 digits that are expressed either in the form of a magnetic flux or in the form of an analogue or logic electrical signal; a logic signal is able to assume only two values termed "logic zero" and "logic one."

One known magnetic recording method involves recording consecutive items of information on a magnetic medium, so there is created on each track of the medium consecutive small magnetic domains termed "elementary magnetic areas." The areas are distributed along the entire length of an annular track so that the induced magnetism in adjacent areas is of opposing value and sense; the induced magnetism in each area is oriented in a direction parallel to the surface of the disc. Each cell as defined above represents two changes in the magnetization polarity. Each of these changes may occupy one of two predetermined positions within the cell to form a binary bit.

The present trend in the development of magnetic discs is to increase the density of the information. For this purpose, increases are made both in the radial density (which means increasing the number of recording tracks per unit length along the disc radius) and in the longitudinal density (which means increasing the number of bits per unit length along the circumference of the recording tracks). It is clear that as the density of the information increases, there is a greater probability of having recording faults or errors on the disc. Because of this, there is a possibility of the sectors, as defined above, containing faults. The current practice is to provide, on each face, a number of additional sectors, termed "standby" sectors, intended to receive the information normally contained in the sectors having faults.

BRIEF DESCRIPTION OF THE INVENTION

To prevent the information read from the disc and transmitted to the data-processing system from containing errors due to the presence of faults, provision is made, in accordance with the invention, for each sector (including the standby sectors) to be preceded by information indicating whether or not it contains faults. This is achieved by inserting fault-indicating information into a reference zone in each sector. The fault indicating bit in each sector includes fault and parity bits. The values of the fault bits depend on whether the sector contains a fault, while the value of the parity bits depend on the parity bit location and the value of the fault bits.

Such a writing method is simple and enables read out of the magnetic disc with high reliability; the reference zones in the sectors also contain a maximum of information to assist the system in dealing with the disc.

The invention relates to a method of writing or packing information relating to faults in a magnetic recording medium in which the items of information carried by a plurality of tracks are written in a plurality of sectors. Each sector includes at least one reference zone containing information for identifying the tracks, while only some of the sectors are standby sectors containing information which would normally be contained in the sectors which show faults. The feature of this method of writing is that the reference zones in all the sectors containing "fault-indicating" information which indicates whether or not the sectors are faulty.

It is accordingly an object of the invention to provide a new and improved method of writing or packing fault, i.e., error indicating, information into a magnetic recording medium, and to such a medium per se.

Another object of the invention is to provide a method of writing or packing fault-indicating information into reference zones of all sectors of a magnetic disc memory, and to such a disc per se.

A further object of the invention is to provide a method of writing or packing fault and parity indicating bits into a magnetic recording medium, so that the recorded parity bit can be compared in a data processor with a parity bit calculated from the fault bit to determine if the fault bit supplied to the processor is correct, and to such a disc per se.

The above and still further objects, features and advantages of the present invention will become apparent upon consideration of the following detailed description of one specific embodiment thereof, especially when taken in conjunction with the accompanying drawings.

BRIEF DESCRIPTION OF THE DRAWINGS

FIG. 1 comprised of FIGS. 1a–1d is an illustration of a preferred manner of distributing information over the surface of a magnetic disc as in the prior art;

FIG. 2 is an illustration of a prior art embodiment of an individual cell from a reference zone;

FIG. 3 comprised of FIGS. 3a and 3b is an illustration of the full set of sectors on a disc including the standby sectors; and FIG. 4 is an illustration of an example, according to the invention, of a way of arranging fault-indicating information in a reference zone.

DETAILED DESCRIPTION OF THE DRAWINGS

In order to better understand the principles of operation and parts of the method of writing information relating to magnetic recording faults according to the invention, aspects of the prior art are reviewed, by referring to FIGS. 1 and 2. In FIG. 1 is illustrated a preferred manner of distributing information over magnetic disc D while an individual cell in a reference zone is illustrated in FIG. 2.

In FIG. 1a a magnetic disc D rotates counterclockwise in the direction of arrow F and has a useful recording area bounded by concentric circles d1 and d2. On disc D are n equal sectors So ... Si ... Sn of a circle. As more clearly illustrated in FIG. 1b, each sector Si is divided into two parts, SDOi and SADi, in which are respectively recorded (1) the stored data to be processed by the data processing system including the disc memory, and (2) the addresses of the tracks and the information for identifying the tracks, i.e., the information required to servo-control the position of the magnetic head T with respect to circumferential axes Axj of the tracks; axes Ax0, Ax1, Ax2, Ax3, and Ax4 are illustrated. Hence, the addressing information, in the form of track addresses and track identification, is interspersed with the data tracks. The area of part SADi is much, much less than the area of part SDOi.

FIGS. 1c and 1d are enlarged views of part SADi of a sector Si contained within circle C. Each SADi part of a sector Si is divided into N zones ZRPi0 ... ZRpij ... ZRPi (N−1), each of which has a different radial position; the N zones are termed reference positioning zones. For simplicity, only the first five zones ZRPi0 and ZRPi4 are shown in FIGS. 1c and 1d, these zones being represented by annular segments in FIG. 1c and as rectangles in FIG. 1d.

The boundaries between the various zones ZRPij are the circular axes Axj of the magnetic tracks. Each magnetic track of serial number j and axis Axj has a zone ZRPij associated with it, so axis Ax0 defines the inner circumference of zone ZRPi0, axis Ax1 defines the inner circumference of zone ZRPi1, etc. and track 0 is associated with zone ZRPi0, track 1 is associated with zone ZRPi1, etc. The number of cells in each reference positioning ZRPij zone is at least equal the number of bits required to write the addresses of the tracks.

An example of an individual cell of zone ZRPij is shown in FIG. 2, wherein there are shown a complete cell Ck and portions of cells Ck−1 and Ck+1 adjacent cell Ck. Each cell, e.g., cell Ck, is divided into four equal length parts CP1, CP2, CP3 and CP4, with boundaries Pn lying between adjacent parts, e.g., boundary P1 lies between parts CP1 and CP2, boundary P2 lies between parts CP2 and CP3, boundary P3 lies between parts CP3 and CP4, and boundary P4 lies between part CP4 of cell Ck and part CP1 of cell Ck+1. Each cell contains two successive changes in the magnetic polarity of the magnetic disc. For cell Ck in FIG. 2, these changes are indicated by double lines. In FIG. 2 are also shown, for cell Ck, the polarity of the induced magnetism in each of the parts CP1 to CP4.

Each of the two changes in the magnetization polarity is able to occupy either of two positions:

the first change may occupy either position P1 or position P2, the second change may occupy either position P3 or position P4.

In the prior art, the majority of the individual cells in a zone ZRPij contain information required to servo-control the position of head T to track j and the address bits for this same track; the information and the address bits being respectively represented by the first and second changes in a cell. Changes occupying positions P1 and P3 represent bits equal to "logic zero," while those changes occupying positions P2 and P4 represent bits equal to "logic one."

As mentioned above, because use is made of magnetic discs having high information density both radially and circumferentially, there is a more than negligible likelihood of a sector on the disc containing faults. For this reason, there are provided on each face of the disc D, in addition to the n sectors So to Sn−1, additional sectors SSj, termed standby sectors, as seen in FIG. 3. A few units of such standby sectors are provided; in the illustrated embodiment, there are three standby sectors SS1, SS2 and SS3. Sectors SS1, SS2 and SS3 are identical with sectors So to Sn−1; each of these sectors therefore contains a reference zone for each of the N tracks.

The faults in magnetic disc D are located by checking operations which are performed on the disc by the manufacturer immediately after manufacture. It is therefore known which sectors on the disc contain faults and which tracks within the sectors are affected by the faults.

To prevent the faults from disturbing the correct readout of information from the face of disc D by magnetic head T, it is necessary, for every section of track contained in any sector on the disc face, to record information indicating whether or not the section contains a fault which makes it impossible to write into it or read from it.

In accordance with the invention, this fault-indicating information is written, within each reference zone, in a cell C1, preferably located at the beginning of the zone, as shown in FIG. 4. In FIG. 4 there are shown ten adjoining reference zones ZRPi (j−6) ... ZRPij ... ZPRi (j+3) of the same sector Si. Each zone contains ten identical cells C1 to C10; nine of the cells, namely cells C2 to C10, contain the addresses of the tracks and the information required to servo-control the position of a magnetic heat T to these tracks.

In accordance with a feature of the invention, cell C1 of reference zone ZRPij in sector Si contains two items of information relating to faults in track j of the sector Si+1 which follows Si on the disc; the first item, termed BCPij, may only occupy either position P1 or position P2, while the second item, termed BDij, may only occupy either position P3 or position P4.

Cell C1 includes an additional change of magnetic polarity at position P0 to enable the beginning of the reference zone to be located.

When the first two items of information BCPij and BCPi(j+1) in two adjoining radially displaced reference zones ZRPij and ZRPi(j+1) of the sector i occupy the same position, be it P1 or P2, the first item of information (BCPij) in track j of sector i is said to equal 1. When one of the items of information occupies position P1 and the other P2, then the first item of information (BCPij) in track j of sector i equals zero. Similarly, when the second two items of information BDij and BDi(j+1) occupy the same position, be it P3 or P4, BDij equals 1. When one of the second two items occupies position P3 and the other item occupies position P4, BDij equals zero. The items of information BDij and BCPij are respectively termed fault and parity bits.

When fault bit BDij equals zero, the section of track j in sector Si+1, i.e., zone ZRP(i+1)j, contains a fault. In an opposite manner, if BDij equals 1, there is no fault in zone ZRP(i+1)j.

The value of the parity bit BCPij is dictated by whether there is an even or odd number of binary bits in the 17 bits that form a word defining the complete address of the track and the fault bit BDij is selected so there is an even number of binary bits in the seventeen bit word. The seventeen bits in a word are:

nine bits for the track address,
six bits for the sector number,
one bit for the side or face of the disc, and
one fault bit BDij.

Hence, for the same sector (i) on the same disc face, the value of bit BCPij varies as a function of two factors, namely the track serial number j and the value of bit BDij. The values of bits BDij and BCPij for 9 exemplary tracks in a single exemplary sector numbered 8 (binary value 1000) on the one face (face 0) of a disc are given in the following Table.

TABLE

| Track number j | Track address (in binary) | Sector number (in binary) | Disc face | $BD_{ij}$ | $BCP_{ij}$ |
|---|---|---|---|---|---|
| 16 | 10000 | 1000 | 0 | 1 | 0 |
| 15 | 01111 | 1000 | 0 | 1 | 1 |
| 14 | 01110 | 1000 | 0 | 1 | 0 |
| 13 | 01101 | 1000 | 0 | 1 | 0 |
| 12 | 01100 | 1000 | 0 | 0 | 0 |
| 11 | 01011 | 1000 | 0 | 1 | 0 |
| 10 | 01010 | 1000 | 0 | 0 | 0 |
| 9 | 01001 | 1000 | 0 | 1 | 1 |
| 8 | 01000 | 1000 | 0 | 1 | 0 |

The values of bits BDij and BCPij are calculated before the information is written onto the disc.

The read out signals from the information contained in zones ZRPij, and in particular that information contained in the cells C1, which are emitted by the head T, are analog signals which are converted into logic pulses by signal-shaping circuits (not shown) contained in the disc memory. These logic pulses are transmitted to a piece of apparatus for monitoring the disc memory, termed a monitor, which belongs to the same data-processing system as the disc memory to which disc D belongs. This monitor thus receives bits Bdij and BCPij.

Because the data processor controls the position of head T, the processor contains signals indicating the serial number of the track j, the face number of the disc, and the number of the sector Si where head T is located. From these head position signals and from the value of the bit BDij which is read out by head T to the monitor, the monitor calculates a parity bit TBCRij, which is then compared with read out parity bit BCPij. If the two compared parity bits are the same, this means that no error has taken place in the transmission of the signals BDij and BCPij and that the received bits BDij and BCPij represent correct information relating to faults in disc D. It is for this reason that it is necessary to associate bit BCPij with bit BDij since if this were not done, it would be impossible to find out whether the fault indicating information on disc D, which is provided by bit BDij and transmitted to the monitor, is correct or not.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. A method of writing information relating to faults in a magnetic recording medium, wherein items of information carried by a plurality of tracks are written in a plurality of sectors, each of said sectors including at least one reference zone containing information for identifying the tracks, some of the sectors being standby sectors containing information which would normally be contained in the faulty sectors, comprising writing into the reference zones of all the sectors fault-indicating information which indicates whether or not the sectors are faulty, the fault-indicating information in each sector including fault and parity bits, writing the value of the fault bits so they depend on whether the sectors contain faults, writing the value of the parity bits so they depend on the location of the parity bit and the value of the fault bits.

2. The method of claim 1 further including writing the value of the parity bits so they are dependent on the numbers of the track and sector in which the parity bit is located.

3. The method of claim 1 wherein the magnetic recording medium is a magnetic disc having two recording faces, the number of reference zones ZRPij in a sector Si being equal to the number of tracks on each face, each zone being associated with a track j and including a fault bit BDij and a parity bit BCPij.

4. The method of claim 3 wherein the fault and parity bits are written into the beginning of each reference zone.

5. The method of claim 3 wherein the fault bits and parity bits are written into an individual cell containing first and second changes in magnetization polarity, each of said changes being capable of occupying one of only two predetermined positions within each cell, the value of the fault and parity bits respectively depending upon the relative positions occupied by the first and second changes in the magnetization polarity of two adjoining reference zones ZRPij and ZRPi(j+1).

6. The method of claim 5 further including writing an indexing flux at the beginning of the reference zone to enable the beginning of the reference zone to be identified.

7. The method of claim 4 wherein the fault bits BDij and the parity bits BCPij for sector i, track j, are the items of fault information for sector i+1.

8. A magnetic recording medium comprising a plurality of sectors located along the length of the medium, each of said sectors including a plurality of data tracks and at least one reference zone containing information for identifying the tracks, some of the sectors being standby sectors containing information which would normally be contained in sectors containing errors, the reference zones of all the sectors containing fault-indicating information which indicates whether or not the sectors are faulty, the fault-indicating information in each sector including fault bits which indicate whether the sectors contain faults, and parity bits having a value dependent on the location of the parity bit and the value of the fault bits.

9. The medium of claim 8 wherein the parity value is dependent on the number of the track and the number of the sector where the parity bit is located.

10. The medium of claim 8 wherein the magnetic recording medium is a magnetic disc, the number of reference zones ZRPij in a sector Si being equal to the number of tracks on each face, each zone being associated with a track j and including a fault bit BDij and a parity bit BCPij.

11. The medium of claim 8 wherein the fault and parity bits are located at the beginnig of each reference zone.

12. The medium of claim 10 wherein the fault bits and parity bits are located within an individual cell containing first and second changes in magnetization polarity, each of said changes being capable of occupying one of only two predetermined positions within each cell, the value of the fault and parity bits BDij and BCPij respectively depending upon the relative positions occupied by the first and second changes in the magnetization polarity of two adjoining reference zones ZRPij and ZRPi(j+1).

13. The medium of claim 12 wherein the first cell contains an indexing part to enable the beginning of the reference zone to be identified.

14. The medium of claim 12 wherein the fault bits BDij and the parity bits BCPij for sector i, track j, are the items of fault information for sector i+1.

15. A method of checking whether information read from a magnetic recording medium is correct, said record including a plurality of data tracks and at least one reference zone containing information for identifying the tracks, some of the sectors being standby sectors containing information which would normally be contained in sectors containing errors, reference zones of all the sectors containing fault-indicating information which indicates whether or not the sectors are faulty, the fault-indicating information in each sector including: fault bits to indicate whether the sectors contain faults, and parity bits dependent on the location of the parity bit and the value of the fault bit at the same location; in a data processor controlling the location of a read out head, computing an expected value for the parity bit in response to the controlled position for the head and the value of the fault bit read by the head; and comparing the expected parity bit value with the read out value for the parity bit.

* * * * *